United States Patent [19]

Sato et al.

[11] Patent Number: 4,797,809
[45] Date of Patent: Jan. 10, 1989

[54] DIRECT MEMORY ACCESS DEVICE FOR MULTIDIMENSIONAL DATA TRANSFERS

[75] Inventors: Kei Sato, Yokohama; Noboru Murayama, Tokyo, both of Japan

[73] Assignee: Ricoh Company, Ltd., Tokyo, Japan

[21] Appl. No.: 118,712

[22] Filed: Nov. 4, 1987

Related U.S. Application Data

[63] Continuation of Ser. No. 646,502, Aug. 31, 1984, abandoned.

[30] Foreign Application Priority Data

Sep. 7, 1983 [JP] Japan ................................. 58-164520

[51] Int. Cl.[4] ............................................. G06F 12/00
[52] U.S. Cl. ................................... 364/200; 340/724; 340/727
[58] Field of Search ... 364/200 MS File, 900 MS File; 340/727, 724, 801, 723; 382/46, 41, 44, 45, 47

[56] References Cited

U.S. PATENT DOCUMENTS

| | | | |
|---|---|---|---|
| 4,203,107 | 5/1980 | Lovercheck | 340/799 |
| 4,471,463 | 9/1984 | Mayer et al. | 364/900 |
| 4,489,317 | 12/1984 | Shiga | 340/726 |
| 4,491,834 | 1/1985 | Oguchi | 340/726 |
| 4,511,962 | 4/1985 | Machida et al. | 364/200 |
| 4,528,693 | 7/1985 | Pearson et al. | 382/47 |
| 4,545,014 | 10/1985 | Oguchi | 364/200 |

Primary Examiner—Thomas M. Heckler
Assistant Examiner—Jonathan C. Fairbanks
Attorney, Agent, or Firm—Mason, Fenwick & Lawrence

[57] ABSTRACT

A direct memory access device has an increment counter for indicating an address increment between succeeding transfer blocks of data from a first storage location to a second storage location within a memory device. Each block of data has a lateral width determined by the content of a line byte counter associated with both the source and destination areas of the memory device. After the transfer of each block of data, the address is advanced by an amount corresponding to the content of the increment counter. The direct memory access device is capable of multi-dimensional data transfers; for example, two- and three-dimensional transfers.

6 Claims, 3 Drawing Sheets

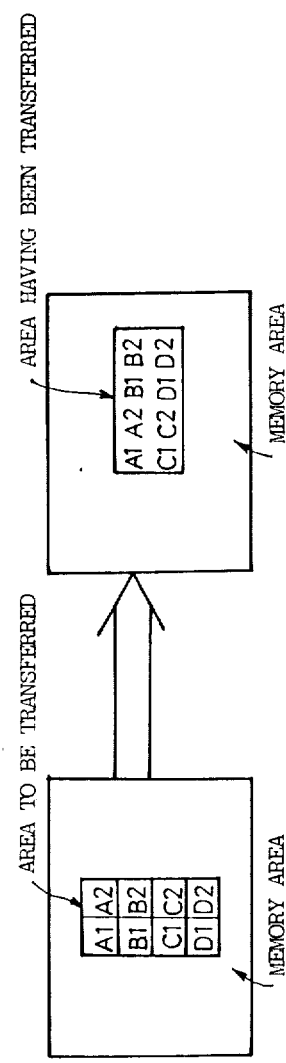

DIRECT MEMORY ACCESS DEVICE FOR MULTIDIMENSIONAL DATA TRANSFERS

This application is a continuation of application Ser. No. 646,502, filed Aug. 31, 1984, now abandoned.

FIELD OF THE INVENTION

The present invention relates to a transfer device for transferring from a source storage location image information such as pattern information from a character generator, half tone pattern information, or bit image information to a printer, CRT display unit, memory unit, etc., constituting a destination storage location and more particularly to a transfer device of direct memory access (hereinafter abbreviated to as DMA) type.

DESCRIPTION OF THE PRIOR ART

A conventional DMA device is operable to offer just one-dimensional transfer in which, by presetting the DMA start address and the number of bytes to be transferred on both the source side and the destination side, one line comprising successive addresses on the source side is transferred to one line comprising successive addresses on the destination side. When character patterns, etc., are transferred to a CRT display or the like, DMA settings must be performed for each line of information to be transferred. As a result, a processor (microcomputer) for setting the source side head or beginning address, the destination side beginning address as well as the number of words to be transferred is required frequently to run the setting operation. Consequently, the processor must execute many tasks and thus prolong the data transfer time.

SUMMARY OF THE INVENTION

It is an object of the present invention to reduce the number of tasks, particularly the number of DMA settings, to be effected by a processor used in an image information processing system for performing DMA transfer.

To achieve the above object, the present invention comprises a source start address register (or source start address holding means) for indicating the start address of transferred data, a destination start address register (or destination start address holding means) for indicating the start of the destination addresses, a line byte counter (or line byte holding means) for indicating how many bytes are transferred as successive data, a line counter (or line holding means) for indicating how many such lines are transferred, and an increment counter (or increment holding means) for indicating an increment between line and line. The present invention further includes a page register (or page holding means) operable to instruct the page when a destination memory is formed on a page-to-page basis. Data having a lateral width determined by the content of the line byte counter is transferred. A number of lines determined by the content of the line counter are transferred. Subsequently, the address is advanced by an amount corresponding to the content of the increment counter and similar transfer is then repeated. Where a page register is included, the foregoing transfer is made to the page indicated by the content of the page register.

Other objects and features, together with the foregoing, are attained in the embodiments described in the following description and illustrated in the accompanying drawings.

BRIEF DESCRIPTION OF THE DRAWINGS

FIG. 3 is a plan view showing the relationship between the memory data prior to transfer and the data having been transferred.

DESCRIPTION OF THE PREFERRED EMBODIMENT

Figure 1:
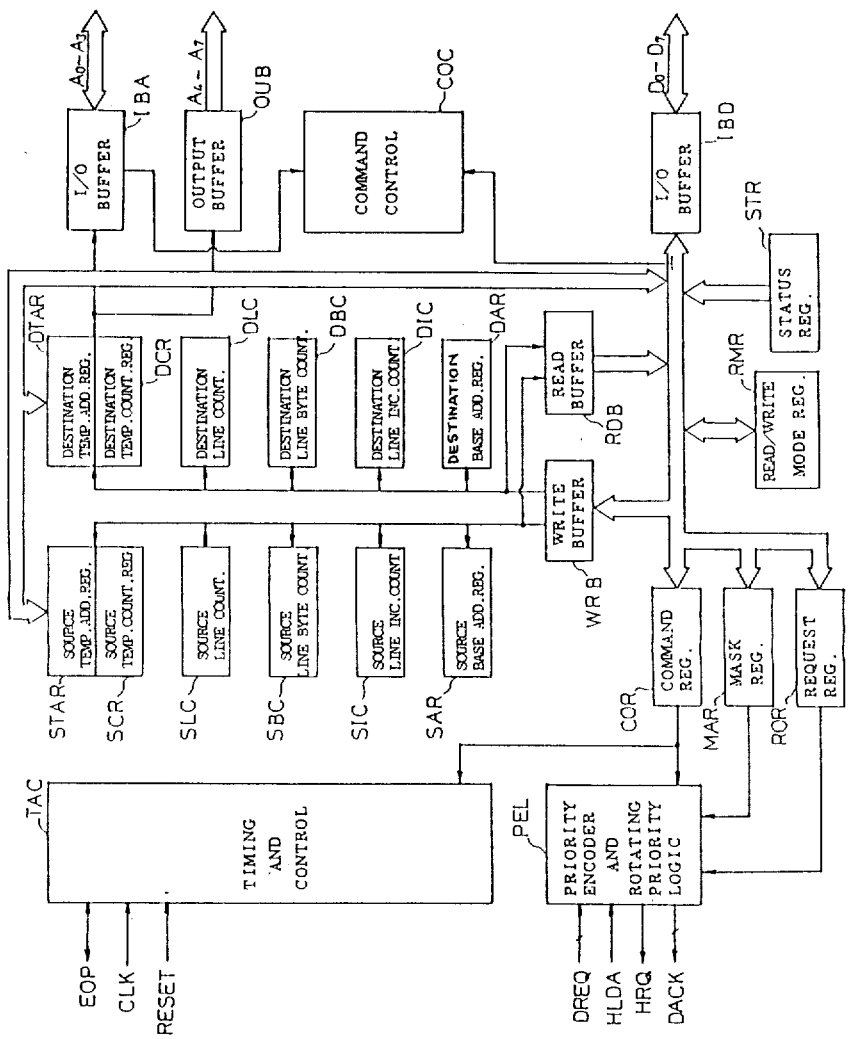
FIG. 1 is a block diagram showing the configuration of one embodiment of the present invention.

A timing and read/write control TAC and a priority control PEL shown in FIG. 1 are connected to a processor (microcomputer: not shown) in a computer system using such a DAC of FIG. 1. DMA transfer is controlled in a given sequence in accordance with commands and control pulses.

A source side line increment counter SIC and a destination side line increment counter DIC are included in the embodiment of FIG. 1. The remaining elements are similar to those found in the conventional DAC. A command control COC decodes commands sent from the processor (not shown) and the timing and read/write control TAC, and then sets the state of each of the following elements shown in FIG. 1.

A source side current address register STAR holds the current source side read address. A destination side address register DTAR holds the current destination side write address. A current line number counter register SCR holds the current number of read lines on the source side. A current line number count register DCR holds the current number of write lines on the destination side. A source side line counter SLC indicates the goal number of read lines on the source side. A destination side line counter DLC indicates the goal number of write lines on the destination side. A source side byte counter SBC indicates the goal number of read bytes in one line. A destination side byte counter DBC indicates the goal number of read bytes in one line. A source side increment counter SIC indicates the address difference between the previous transfer block and the subsequent transfer block on the source side. A destination side increment counter DIC indicates the address difference between the previous transfer block and the subsequent transfer block on the destination side. A source side start address register SAR holds the source side transfer start address. Finally, a destination side start address register DAR holds the destination side transfer start address.

Further, designated at IBA is an input/output buffer memory (for lower digit addresses), at OUB is an output buffer memory (for upper digit addresses), at IBD is an input/output buffer memory (for data), at WRB is a buffer memory for writing (setting) to the counters and registers, at RDB is a buffer memory for reading from the counters and registers, at COR is a command register, at MAR is a mask register, and at RQR is a request register.

Moreover, the designation and meaning of the input/output signals shown in FIG. 1 are as follows:

EOP: End of process. The signal contains information relating to completion of DMA. When the number of transferred bytes for each DMA channel becomes null, one end of process pulse EOP is issued.

CLK: Clock. Clock signals are provided to control the data transfer rate of the DMA device.

RESET: A synchronous reset signal is employed to clear the command, status, request and other registers.

DREQ: DMA request. The DMA request signal is in the asynchronous channel for effecting DMA.

HLDA: Hold acknowledge. The hold acknowledge signal is transmitted from the processor to indicate cancellation of system bus control.

HRQ: Hold request. The hold request signal is transmitted to the processor and used only in requesting system bus control.

DACK: DMA acknowledge. The DMA acknowledge signal indicates the DMA is permitted.

D0–D7: Data lines.

A0–A7: Address lines.

Figure 2:
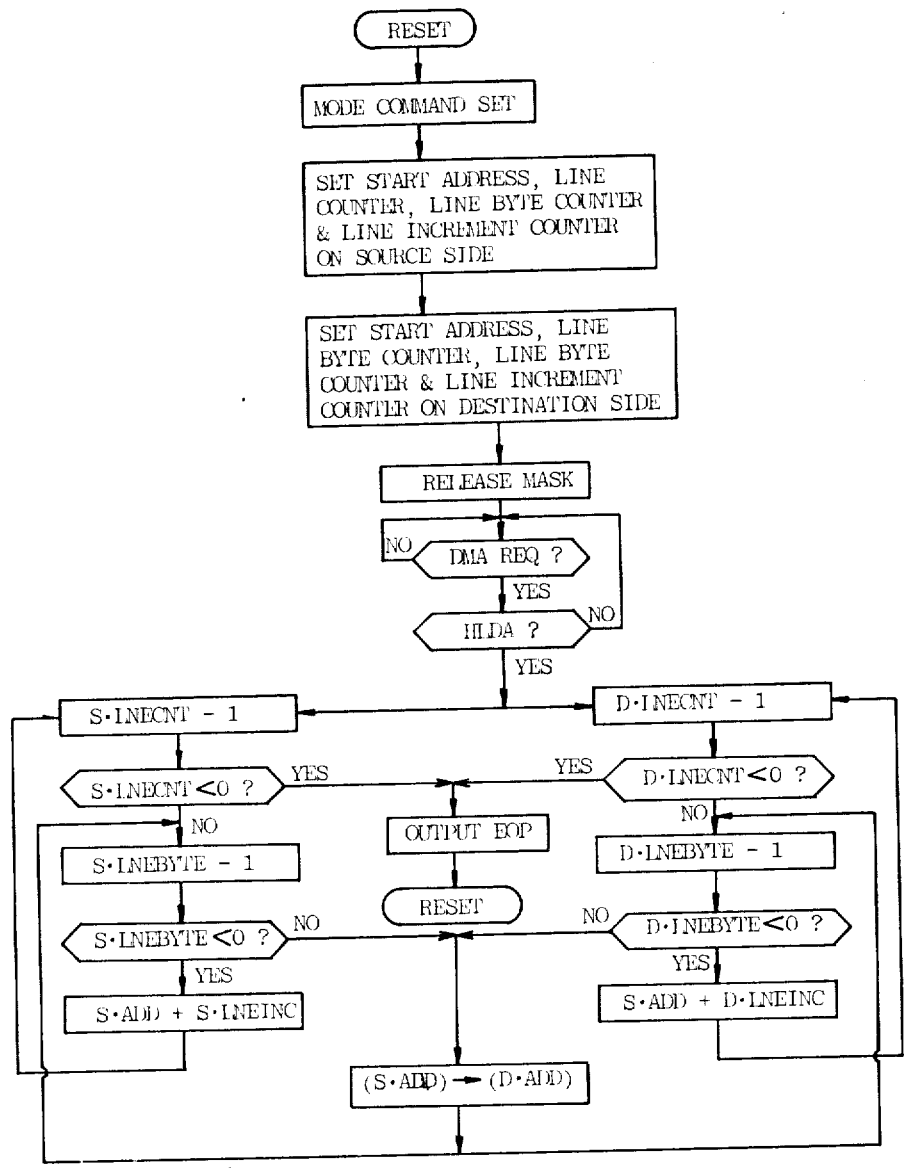
FIG. 2 is a flowchart showing the transfer operation of the embodiment shown in FIG. 1.

FIG. 2 is a flowchart that shows the operation of the DAC device shown in FIG. 1. Operation of the DAC device is executed by the timing and read/write control TAC in combination with the command control COC and the priority control PEL.

The operation of the DAC device takes place as follows: Initially, the processor issue instructions to reset the DMA device, and then operates in a DMA transfer mode to issue commands to the DMA device. In response to commands issued during the DMA transfer mode, the DMA device sets certain parameters in accordance with transfer information and commands transmitted from the processor. In particular, the DMA device sets the DMA start address registers SAR, DAR on both the source side and the destination side, the line counters SLC, DLC for indicating the number of transferred lines, the line byte counters SBC, DBC for indicating the number of bytes constituting one line, and the line increment counters SIC, DIC for indicating the difference between the head addresses of lines. A mask of the required channel is then released.

When a DMA request (DMA REQ) occurs, the data is read out from the DMA start address on the source side (i.e., the content of SAR) and transferred to the start address on the destination side, under the timed control of the timing and read/write control TAC. At this time, the numbers of bytes in a line are counted on both the source side and the destination side and if a line on either side is filled, the address is incremented in accordance with the values in the increment counters SIC, DIC. Thereafter, transfer is continued in a similar fashion.

More specifically, after transferring the data which is on a line containing the start address held in the register SAR and locates in the addresses starting from the start address and determined by the content (initial set value) of the counter SBC, the content of the counter SLC is counted down by one and the data on the next line is then transferred similarly. When the content of the counter SLC becomes zero or less after repetition of the above process (i.e., the data on lines corresponding to the preset number is completely transferred), the start address is updated to such one as equivalent to the sum of the content of STR at that time (i.e., the address at the time when transfer has been completed) and the content of the increment counter. In other words, the contents of the counters STAT, DIC are incremented by one, every time the contents of the registers STAR, SAR, DTAR, DAR, SCR, DCR are incremented by one line. And when the contents of the counters SIC, DIC becomes zero, the above process is stopped and transfer is then performed in a similar fashion. Further, a counter or register is provided on each of the source side and the destination side, so that the value of the counter is added to the final address of the block to be transferred or having been transferred to perform block transfer corresponding to one more counter.

As an alternative, it is also possible that, by using an increment register in place of an increment counter, the sum of the content of STAR and the content of the increment register is set in SAR after transferring one block, and the next block is then transferred.

In this connection, the symbols shown in FIG. 2 have the following meanings:

S.LNECNT: Count data of SLC. −1 means one count down.

S.LNEBYTE: Count data of SBC.

S.LNETNC: Count data of AIC.

S.ADD: Transfer address on the source side; the content of STAR.

D.LNECNT: Count data of DLC. −1 means one count down.

D.LNEBYTE: Count data of DBC.

D.LNEINC: Count data of DIC.

D.ADD: Transfer address on the source side; the content of DTAR.

From the above, transfer is performed on a block-to-block basis as shown in FIG. 3. Although the processor had to set DMA addresses and commands for each of A, B, C and D lines in the prior art, it is enough to make setting just one time in the present invention. Three-dimensional DMA transfer can be also practiced by providing a register which is adapted to change pages of digital data.

Because increment holding means, such as a counter or register, insure that one block is first transferred, another block spaced from the former block with a distance corresponding to the preset increment value is then transferred, and thereafter the above process is repeated, the number of necessary DMA transfer settings accomplished by the processor is greatly reduced and the data transfer rate is improved accordingly. In particular, the transfer rate increases during transfer from a character generator to a memory, especially in a system including a CRT display and bit map memory and at the same time, the processor for controlling the system requires fewer control instructions. It is also possible to easily accomplish DMA transfer of images in graphic processing, etc.

Various modifications will become apparent to those skilled in the art after absorbing the teachings of the present disclosure without departing from the scope of the invention.

What is claimed is:

1. A direct memory access device for transferring data from a first storage location to a second storage location within a memory device, said direct memory access device comprising:

first storing means for storing the start address at said storage location of data to be transferred;

second storing means for storing the start address at said second storage location where said data is to be transferred;

source line counting means for indicating the number of first data lines of predetermined length to be read from said first storage location;

destination line counting means for indicating the number of second data lines of predetermined length to be written to said second storage location;

first line byte holding means for storing information indicating how many bytes of data to be transferred are in each of said first lines;

first line storing means for storing information indicating how many of said first lines constitute each of a plurality of source blocks of data to be transferred;

second line byte holding means for storing information indicating how many bytes of data are in each of said second lines;

second line storing means for storing information indicating how many of said second lines constitute each of a plurality of destination blocks of data to be written into said second storage location;

first increment storing measns for storing the size of the address increment to move from one start address to another in said first storage location;

second increment storing means for storing the size of the address increment to move from one start address to another in said second storage location; and control means responsive to the information stored in said first storing means, said source line counting means, said first line byte holding means, said first line storing means, and said first increment storing means for transferring said source blocks of data as a series of first lines in accordance with the information in said first line storing means, said transfer being from said first storage location by addressing the start address of the first of said source blocks and then addressing the start address of each subsequent source block at an address location determined by the size of the increment stored in said first increment storing means and said control means further responsive to the information stored in said second storing means, said destination line counting means, said second line byte holding means, said second line storing means, and said second increment storing means for writing said destnation blocks of data as a series of second lines in accordance with the information in said second line storing means into said second storage location by addressing the start address of the first of said destination blocks and then addressing the start address of each subsequent destination block at an address location determined by the size of the increment stored in said second increment storing means.

2. The device of claim 1, wherein said source and destination blocks are of different configuration.

3. The device of claim 1, wherein each of said first and second storing means is an address register.

4. The device of claim 1, wherein each of said first and second line storing means is a counter.

5. The device of claim 1, wherein each of said first and second increment storing means is a counter.

6. the device of claim 1, wherein each of said first and second increment storing means is a register.

* * * * *